(12) United States Patent  
Lietz

(10) Patent No.: US 7,965,739 B2
(45) Date of Patent: Jun. 21, 2011

(54) METHOD AND DEVICE FOR TRANSMITTING DATA

(75) Inventor: Stephan Lietz, Bad Salzdetfurth (DE)

(73) Assignee: Robert Bosch GmbH, Stuttgart (DE)

( * ) Notice: Subject to any disclaimer, the term of this patent is extended or adjusted under 35 U.S.C. 154(b) by 882 days.

(21) Appl. No.: 11/228,951

(22) Filed: Sep. 16, 2005

(65) Prior Publication Data

US 2006/0072612 A1 Apr. 6, 2006

(30) Foreign Application Priority Data

Sep. 17, 2004 (DE) .......................... 10 2004 045 118

(51) Int. Cl.
*H04J 3/02* (2006.01)
*H04J 3/16* (2006.01)
*H04J 3/10* (2006.01)

(52) U.S. Cl. ......... 370/473; 370/462; 370/466; 370/476

(58) Field of Classification Search .................. 370/282, 370/294, 431, 423, 438, 476, 465–467, 473, 370/462; 709/246, 230; 375/240, 240.1, 375/240.26

See application file for complete search history.

(56) References Cited

U.S. PATENT DOCUMENTS

| | | | |
|---|---|---|---|
| 6,233,637 B1 * | 5/2001 | Smyers et al. | 710/311 |
| 6,496,509 B1 * | 12/2002 | Fant | 370/400 |
| 6,519,268 B1 * | 2/2003 | Smyers | 370/536 |
| 6,529,522 B1 * | 3/2003 | Ito et al. | 370/466 |
| 6,584,534 B1 * | 6/2003 | Kobayashi | 710/305 |
| 6,738,823 B1 * | 5/2004 | Pierce | 709/232 |
| 6,744,772 B1 * | 6/2004 | Eneboe et al. | 370/400 |
| 7,002,926 B1 * | 2/2006 | Eneboe et al. | 370/255 |
| 2001/0028780 A1 * | 10/2001 | Na et al. | 386/46 |
| 2002/0099967 A1 * | 7/2002 | Kawaguchi | 713/323 |

* cited by examiner

*Primary Examiner* — Aung S Moe
*Assistant Examiner* — Redentor Pasia
(74) *Attorney, Agent, or Firm* — Kenyon & Kenyon LLP

(57) ABSTRACT

A method for transmitting data, the data to be transmitted being divided into at least two data packets; the data packets being transmitted in at least two transmission modes; an assignment between the data packets and the transmission modes being made in such a way that one of the transmission modes is assigned to each data packet; at least one data packet, to which a first transmission mode is assigned, being transmitted in a second transmission mode.

20 Claims, 4 Drawing Sheets

METHOD AND DEVICE FOR TRANSMITTING DATA

FIELD OF THE INVENTION

The present invention relates to a method for transmitting data, a device for carrying out this method, and a computer program as well as a computer program product.

BACKGROUND INFORMATION

Reference is made below, in particular, to the optimization of real-time data transmission according to the IEEE 1394 standard (IEEE Std 1394-1995, Standard for a High-Performance Serial Bus) and its supplements (IEEE project P1394a, Draft Standard for a High-Performance Serial Bus (Supplement); IEEE project P1394b, Draft Standard for a High-Performance Serial Bus (Supplement)), without the method being limited to this application or this standard.

Standard IEEE 1394 defines a bus that implements the control and status register (CSR) architecture (ISO/IEC 13213:1994, Control and Status Register (CSR) Architecture for Microcomputer Buses). The serial bus based on the IEEE 1394b standard permits communication between nodes or subscribers via different physical media at speeds of 100 to 3,200 Mbps (Megabits per second).

An IEEE 1394 bus is a serial bus. It is used to transfer the data bits to be transmitted consecutively (serially).

Certain home electronics applications, such as digital cameras, video and audio recorders and TV sets, as well as traditional computer applications, such as tape drives, printers, scanners, and storage media, provide data connections based on the IEEE 1394 standard. The IEEE 1394 bus forms a basis for linking these two areas.

The IEEE 1394 link layer permits packet-oriented data transmission using both acknowledged and unacknowledged data packets.

In the case of acknowledged data transfers, packets including the transmitter and receiver addresses are transmitted. The receiver returns an acknowledgement packet to the transmitter after receiving the packet.

In the case of unacknowledged transfers, a transmission channel between the transmitter and receiver having a certain bandwidth is requested from the isochronous resource manager (IRM), and a unique channel ID is assigned to this channel. During data transmission, the transmitter sends data packets having the channel ID and the data, and the receiver accepts only packets having this channel ID.

Transmissions using unacknowledged packets enable data packets to be transmitted within a predetermined time window, while transfers using acknowledged packets permit secure delivery regardless of the amount of time required.

Data is transmitted in cycles. Within each cycle, an isochronous transmission phase is followed by an asynchronous transmission phase. Data packets are transmitted in each cycle. Related data packets, even those from multiple cycles, add up to form data streams.

In the case of the asynchronous type of data transmission, the data transmission may begin at any time. The size of the data packets may be fixed or variable.

Isochronous data transmission is a special type of asynchronous data transmission. In the case of this type, the transmission is guaranteed within a defined period of time.

According to IEEE 1394, acknowledged packets are always transmitted asynchronously and unacknowledged packets asynchronously or isochronously. In addition, the packets transmitted during the isochronous phase are always unacknowledged packets.

The data of the active isochronous channels (ICs) is transferred in the isochronous phase of a transmission according to IEEE 1394. The amount of data is determined by the real data volume present in the transmit buffers of the transmitter. For each channel, however, it should not exceed the data rate reserved in the IRM. This ensures that each device is able to exchange data without interruption. The isochronous phase should make up no more than 80% of the cycle in each case. The rest of the bandwidth that is not used by the isochronous phase is additionally available to the asynchronous phase.

In the asynchronous phase, all network nodes that want to send asynchronous data receive access to the bus. These nodes use special arbitration mechanisms to negotiate access to the bus. The asynchronous phase ends after a specified period of time, regardless of whether all interested nodes were able to transmit their asynchronous data.

Examples of unacknowledged packets transmitted during the asynchronous phase are global asynchronous stream packets (GASP), which are used for Internet Protocol (IP) data transfers via an IEEE 1394 bus (The Internet Task Force, "IPv4 over IEEE 1394", Request for Comments (RFC) 2734).

In the case of a transmission of this type, each data packet is assigned a transmission mode based on the example of the IEEE 1394 standard—namely assignment of the isochronous transmission mode to the usual unacknowledged packets and the asynchronous transmission mode to the GASP and acknowledged packets—as well as a transmitter and one or more (e.g., broadcast) receivers.

Multimedia systems that offer on-demand services (such as radio over IP) must generate and transmit a separate data stream for each receiver. Because the isochronous capabilities of the IEEE 1394 bus make this possible only to a limited extent, packet-based methods may be implemented on an IP basis with the use of the User Datagram Protocol (UDP) and Transmission Control Protocol (TCP). Transmissions via the Real Time Protocol (RTP) or Real Time Streaming Protocol (RTSP) may be based thereon. There are numerous applications that use RTP or RTSP. If an IEEE 1394 bus is used for these data transmissions, TCP datagrams are transmitted as isochronous packets and UDP datagrams as GASP packets.

When other devices or applications connected to the IEEE 1394 bus exchange a large volume of asynchronous data, it is possible that not all GASP packets are transmitted, since bandwidth is not reserved for them.

SUMMARY OF THE INVENTION

In the data transmission method according to the present invention, the data to be transmitted is divided into at least two data packets. The data packets are transmitted in at least two transmission modes, an assignment between the data packets and transmission modes being made in such a way that one of the transmission modes is assigned to each data packet. According to the present invention, at least one data packet, to which a first transmission mode is assigned, is transmitted in a second transmission mode.

The data transmission method expediently has exactly two data transmission modes in which the data packets are transmitted. This makes it possible to limit the implementation complexity.

One transmission mode of the data transmission method is advantageously the isochronous transmission mode, and another transmission mode is the asynchronous transmission mode. These two transmission modes are among the most important modes for transmitting data and may also be advantageously used in the method described here.

In a preferred embodiment of the method according to the present invention, at least one data packet, to which the asynchronous transmission mode is assigned, is transmitted isochronously.

In a particularly advantageous embodiment of the method according to the present invention, at least one GASP data packet is transmitted isochronously within a time interval or cycle. In terms of its inner structure, a GASP data packet is equivalent to an ordinary unacknowledged data packet and is transmittable together with the ordinary unacknowledged data packets in the isochronous phase without a great deal of implementation effort.

In a preferred embodiment of the data transmission method according to the present invention, at least one data packet, in particular a GASP packet, includes data for at least two receivers and/or data from at least two transmitters. One transmitter and/or one receiver is/are generally assigned to each data packet, and the possible number of data packets to be transmitted per time period is limited. The available time period may be better utilized if one data packet includes data for multiple receivers and/or data from multiple transmitters.

In an especially preferred embodiment of the method according to the present invention, the method is carried out on a data bus according to the IEEE 1394 standard. For the purpose of transmitting data to one or more receivers, a transmitter reserves one or more isochronous channels having the necessary bandwidth from the IRM, the number of receivers not necessarily correlating to the number of channels.

It is also possible for multiple transmitters to share one or more reserved channels. It is further possible for multiple receivers to share one or more reserved channels.

The payload data, for example audio and/or video data, is transmitted via these isochronous channels in the form of UDP datagrams in GASP packets. Each recipient then receives the entire isochronous data stream of its assigned channel. Based on the receiver address in the UDP datagram, the receiver determines which UDP datagrams, or which IP packets in the GASP in general, are directed to that receiver. The data transmission is managed via IP datagrams that are transmitted via the bus in the form of asynchronous packets. This especially preferred embodiment of the method according to the present invention enables GASP packets to be transmitted at a guaranteed bandwidth of the isochronous transmission.

A device according to the present invention carries out all steps of the method according to the present invention.

The computer program according to the present invention, having program code means, is designed to carry out all steps of the method according to the present invention when this computer program is run on a computer or on a corresponding arithmetic unit, in particular a device according to the present invention.

The computer program product according to the present invention, having program code means that are stored on a machine-readable data carrier, e.g., a computer-readable medium, is provided for carrying out the method according to the present invention when this computer program (product) is run on a computer or on a corresponding arithmetic unit, in particular a device according to the present invention.

DETAILED DESCRIPTION

Figure 1:
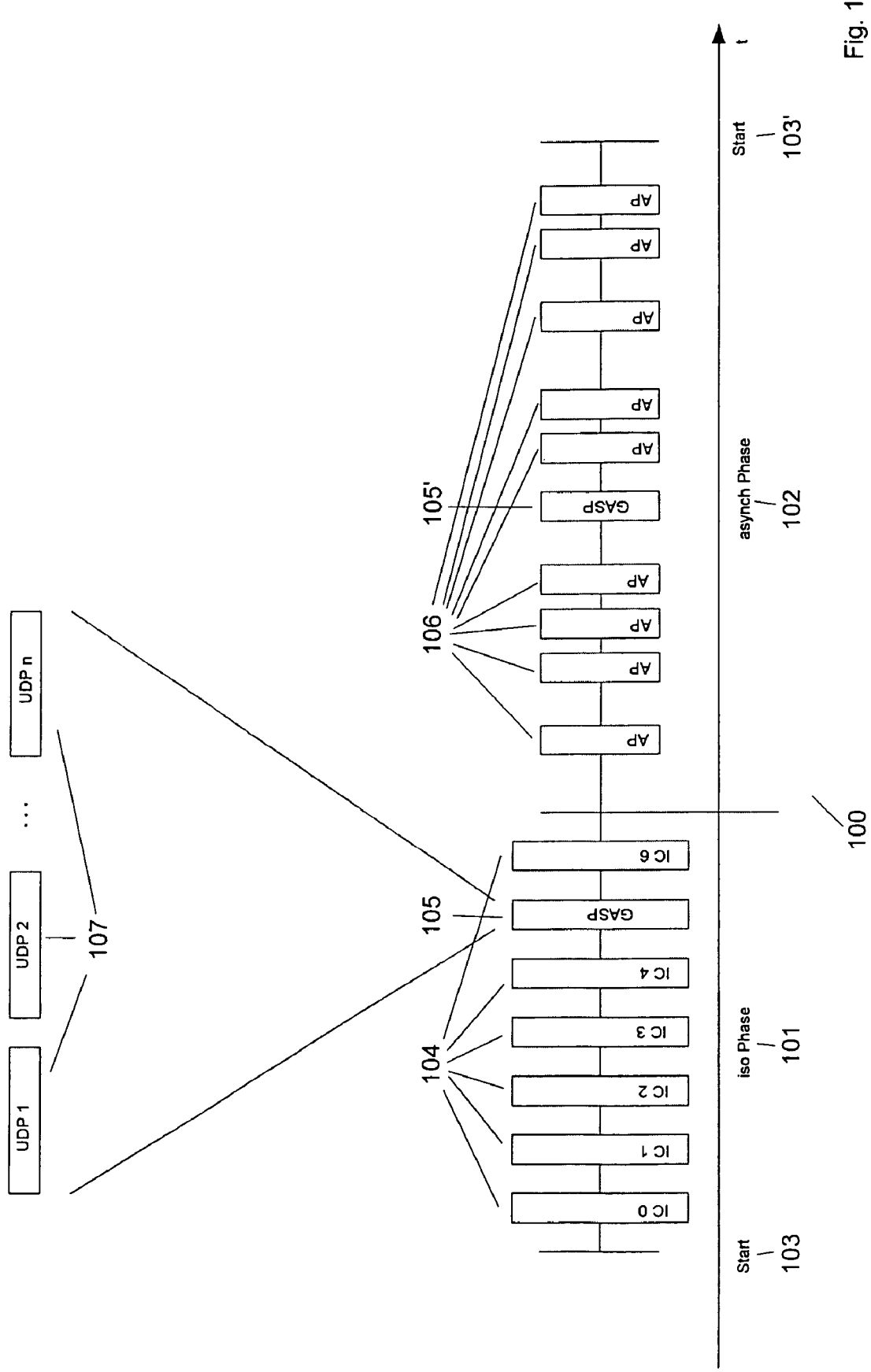
FIG. 1 shows a schematic representation of a data transmission cycle according to a preferred embodiment of the method according to the present invention.

In FIG. 1, a data transmission cycle is identified as a whole by reference number 100. The representation shows the data transmission sequence over time t. The data transmission begins with isochronous phase (iso phase) 101, which is followed by asynchronous phase (asynch phase) 102. Each cycle begins at a periodic point in time, start 103, 103'.

In the first phase of cycle 100, isochronous phase 101, the unacknowledged data packets are first transmitted in isochronous channels 104, which are identified by IC 1 through IC 6, at a guaranteed bandwidth. Subsequently, acknowledged packets AP 106 and unacknowledged GASP packets 105' are transmitted in asynchronous phase 102.

The total number of related packets from consecutive cycles are referred to as streams.

Reserved bandwidth is not assigned to the asynchronous phase. A GASP 105 is transmitted in isochronous phase 101 of cycle 100. This transmission in isochronous phase 101 makes it possible to assign a reserved bandwidth to GASP 105.

To make better use of the available bandwidth, it is possible to combine multiple UDP datagrams 107 into one GASP 105. UDP datagrams 107 are directable to one or more receivers and/or transmittable from one or more transmitters.

This exemplary embodiment demonstrates the preferred transmission of a GASP packet 105 in isochronous phase 101 as well as the known transmission of a GASP packet 105' in asynchronous phase 102.

Figure 2:
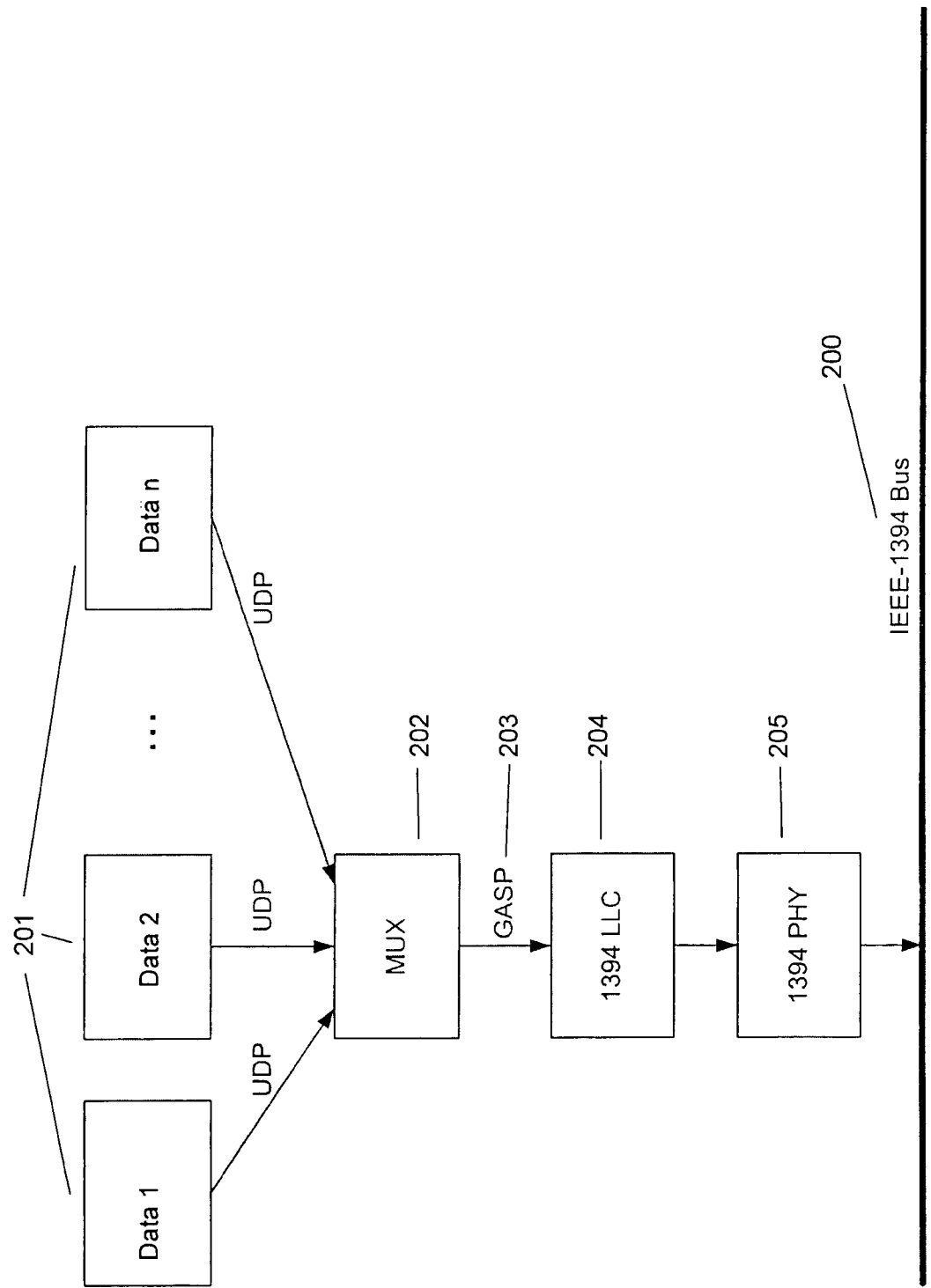
FIG. 2 shows a schematic representation of a data transmission according to a preferred embodiment of the method according to the present invention.

FIG. 2 shows the preferred implementation of the method according to the present invention on an IEEE 1394 bus. The IEEE 1394 bus is identified by reference number 200. The figure shows the two lower protocol layers according to the basic reference model of the International Standards Organization (ISO), known as the Open Systems Interconnect Reference Model (OSI): physical layer (PHY) 205 and link layer (LLC) 204.

PHY 205 establishes an electrical and mechanical connection between the device and IEEE 1394 bus 200. In addition to the current data transmission and receipt tasks, PHY 205 provides decisions to ensure that all devices (not illustrated) have reasonable and fair access to IEEE 1394 bus 200.

LLC 204 provides the two data transmission modes, the asynchronous and isochronous modes.

During data transmission, one or more data packets 201, which are designated as data 1 through data n, are provided to multiplexer (MUX) 202 in the form of UDP datagrams. MUX 202 combines the UDP datagrams into a GASP 203. This GASP 203 is transferred to LLC 204. LLC 204 provides an isochronous link for GASP 203. The GASP is transferred to IEEE 1394 bus 200 via PHY 205.

During a preferred data transmission, one or more data packets 201 are combined to form a GASP 203. Data packets 201 are directable to multiple different receivers (not illustrated) and/or transmittable from multiple different transmitters (not illustrated). This embodiment of the method according to the present invention enables the available bandwidth to be better utilized, since a separate channel does not have to be reserved for each transmitter and/or each receiver.

Figure 3:
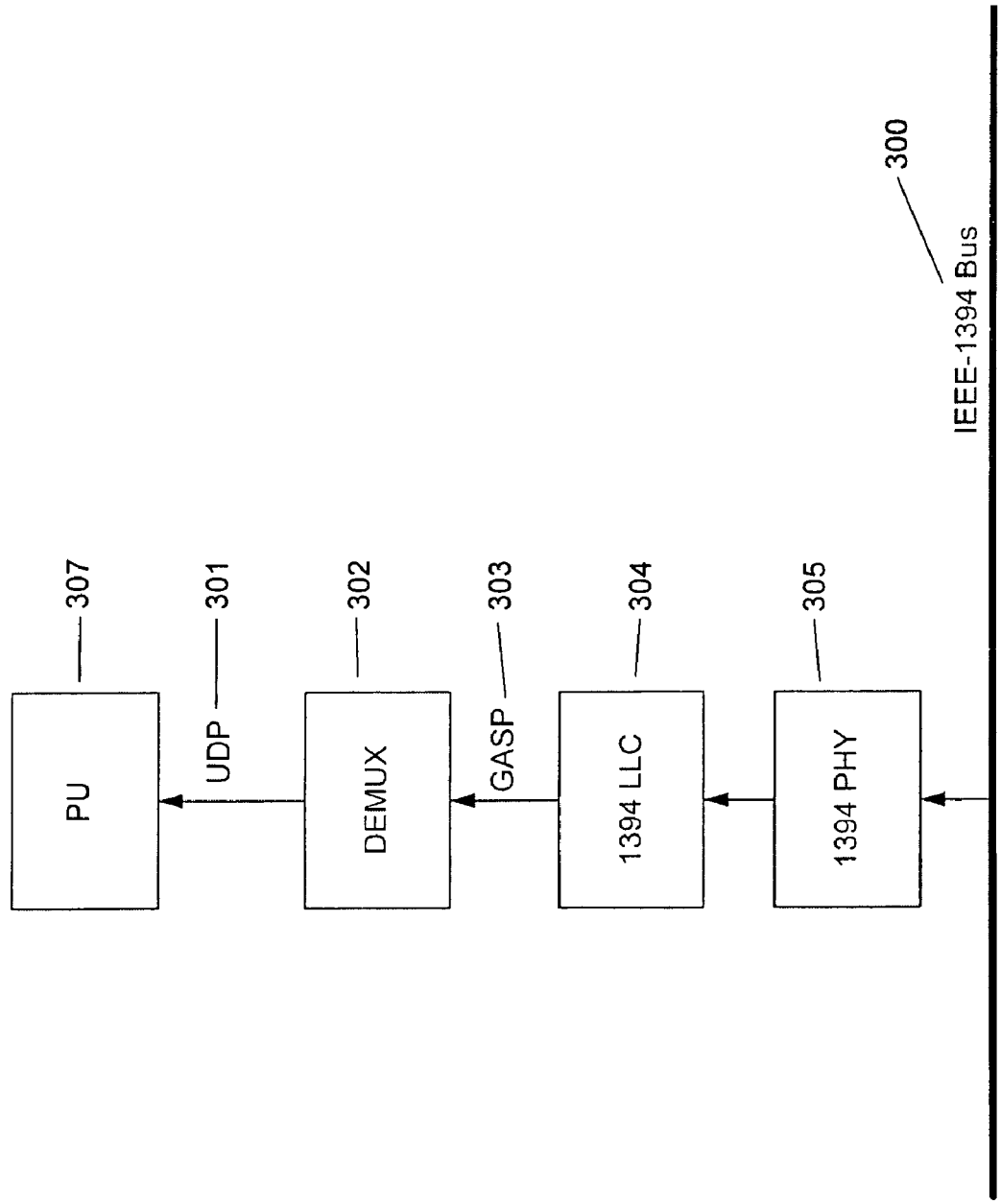
FIG. 3 shows a schematic representation of a data receipt according to a preferred embodiment of the method according to the present invention.

FIG. 3 shows an advantageous embodiment of a data receipt according to the present invention. Physical layer (PHY) 305 establishes the electrical and mechanical connection between the receiver and IEEE 1394 bus 300. Connected thereto is link layer (LLC) 304, which in the present case provides data receipt functions.

LLC 304 receives, among other things, the data from the isochronous channel assigned to the receiver. This data primarily involves GASP 303, which transfers LLC 304 to demultiplexer (DEMUX) 302.

DEMUX 302 divides GASP 303 into individual UDP datagrams (not illustrated). From among the individual UDP datagrams, it selects those datagrams 301 that are directed to the receiver. DEMUX 302 transfers these UDP datagrams 301 to processing unit (PU) 307 of the receiver.

Other receivers (not illustrated) that are also assigned to this isochronous channel also receive all data from this isochronous channel and select therefrom the UDP datagrams (not illustrated) directed to them.

Figure 4:
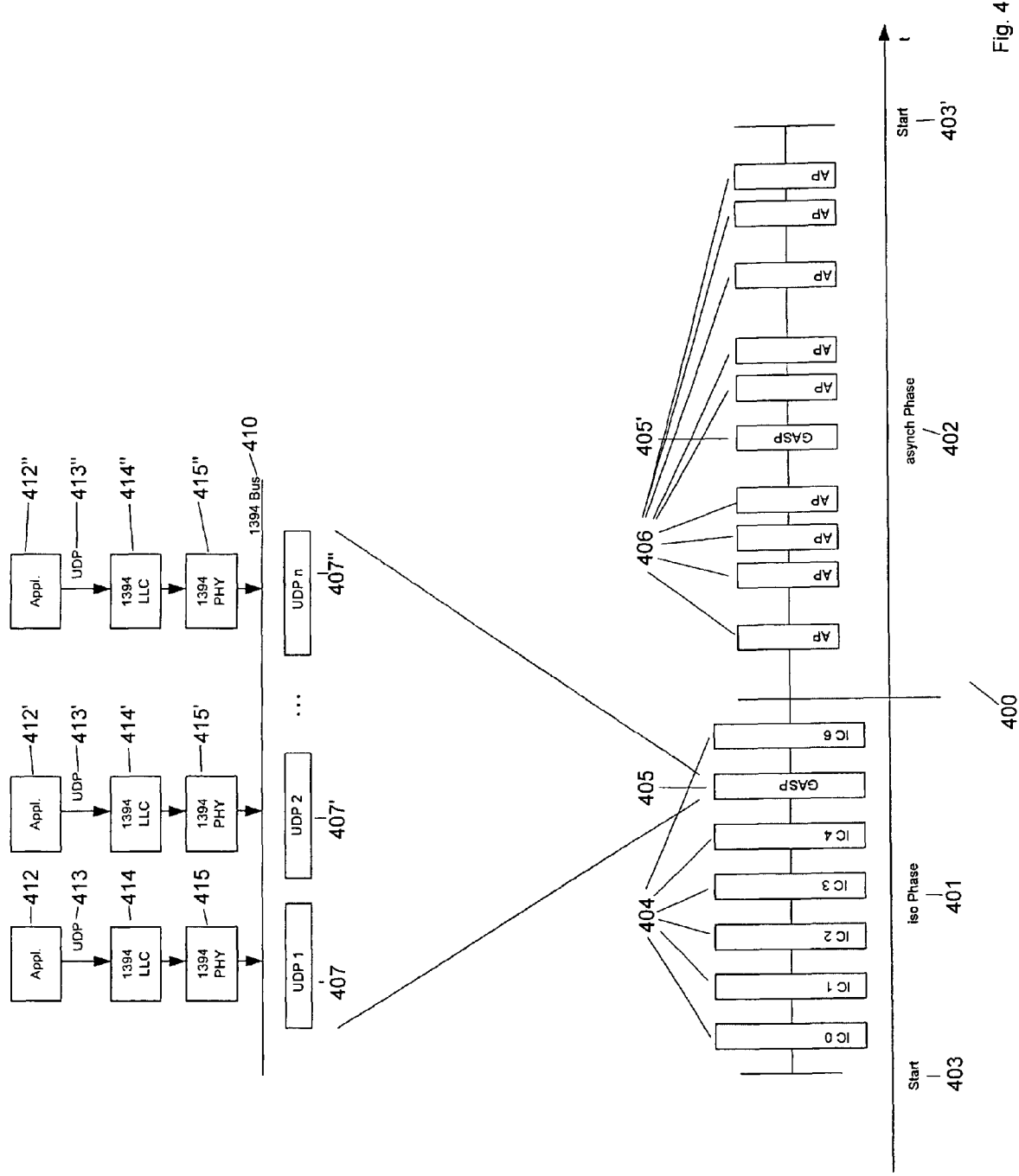
FIG. 4 shows a schematic representation of a data transmission cycle according to a preferred embodiment of the method according to the present invention.

FIG. 4 shows a data transmission cycle 400 over time t, which includes isochronous phase (iso phase) 401 and subsequent asynchronous phase (asynch phase) 402. Each phase begins at a periodic point in time, start 403, 403'.

In the first phase of cycle 400, isochronous phase 401, the unacknowledged data packets are first transmitted in isochronous channels 404, which are identified by IC 1 through IC 6, at a guaranteed bandwidth. Subsequently, acknowledged packets AP 406 and unacknowledged GASP packets 405' are transmitted in asynchronous phase 402.

Reserved bandwidth is not assigned to the asynchronous phase. A GASP 405 is transmitted in isochronous phase 401 of cycle 400. This transmission in isochronous phase 401 makes it possible to assign a reserved bandwidth to GASP 405.

In the illustrated preferred embodiment, multiple UDP datagrams 407, 407', 407" from different transmitters are combined into one GASP 405.

Each assigned transmitter has physical layer (PHY) 415, 415', 415" and link layer (LLC) 414, 414', 414".

Applications (Appl.) 412, 412', 412", which are executed on the respective transmitters, provide, for each transmission cycle, UDP data 413, 413', 413", which is transferred to IEEE 1394 bus 410 via the LLC and PHY layers.

Upon reaching the transmission time for the reserved channel in which GASP packets 405 are transmitted, the first transmitter provides its UDP datagrams 407 to IEEE 1394 bus 410.

The second transmitter subsequently provides its data 407'. This method is repeated until the last assigned transmitter has provided its data 407". If one of the assigned transmitters has no data available for transmission in the current cycle, it does not provide any data.

Isochronous channel IC 6 and asynchronous phase 402 are then processed.

FIG. 4 shows the preferred transmission of a GASP packet 405 in isochronous phase 401 as well as the known transmission of a GASP packet 405' in asynchronous phase 402, UDP datagrams 407, 407', 407" that make up GASP 405 originating from different transmitters.

What is claimed is:

1. A method for transmitting data, comprising:
    transmitting a first data packet using a first transmission mode to which the first data packet has been assigned; and
    transmitting a second data packet using a second transmission mode different from the first transmission mode,
        wherein the second data packet is initially assigned the first transmission mode, the transmitting of the second data packet using the second transmission mode occurring during a time interval exclusively associated with the second transmission mode, and
        wherein the data packets are transmitted in exactly two transmission modes, wherein one transmission mode is isochronous and a further transmission mode is asynchronous, and
    transmitting the second data packet together with further data packets as one global asynchronous stream packet (GASP) data packet.

2. The method according to claim 1, wherein the first transmission mode is asynchronous and the second transmission mode is isochronous.

3. The method according to claim 2, wherein at least one global asynchronous stream packet (GASP) data packet is transmitted isochronously.

4. The method according to claim 1, wherein the second data packet contains at least one of (a) data for at least two receivers and (b) data from at least two transmitters.

5. The method according to claim 1, wherein the method is carried out on a data bus according to the IEEE 1394 standard.

6. The method of claim 1, wherein the transmitting of the second data packet using the second transmission mode is conditioned upon a selecting of the second transmission mode by a transmitter generating the second data packet.

7. The method of claim 6, wherein the transmitter is configured to reserve a transmission channel for transmitting in the second transmission mode.

8. The method of claim 1, further comprising:
    transmitting the second data packet together with further data packets as one global asynchronous stream packet (GASP) data packet;
    wherein the transmitting of the second data packet using the second transmission mode is conditioned upon a selecting of the second transmission mode by a transmitter generating the second data packet, and
    wherein the transmitter is configured to reserve a transmission channel for transmitting in the second transmission mode.

9. The method according to claim 1, wherein at least one global asynchronous stream packet (GASP) data packet is transmitted isochronously, wherein the second data packet contains at least one of (a) data for at least two receivers and (b) data from at least two transmitters, and wherein the method is carried out on a data bus according to the IEEE 1394 standard.

10. The method according to claim 1, wherein the first transmission mode is asynchronous and the second transmission mode is isochronous.

11. The method according to claim 10, wherein at least one global asynchronous stream packet (GASP) data packet is transmitted isochronously, wherein the second data packet contains at least one of (a) data for at least two receivers and (b) data from at least two transmitters, and wherein the method is carried out on a data bus according to the IEEE 1394 standard.

12. A device for transmitting data comprising:
    a transmitting arrangement to transmit a first data packet using a first transmission mode to which the first data packet has been assigned, and to transmit a second data packet using a second transmission mode different from the first transmission mode;

wherein the second data packet is initially assigned the first transmission mode, wherein the transmitting of the second data packet uses the second transmission mode occurring during a time interval exclusively associated with the second transmission mode, wherein the data packets are transmitted in exactly two transmission modes, wherein one transmission mode is isochronous and a further transmission mode is asynchronous, and transmitting the second data packet together with further data packets as one global asynchronous stream packet (GASP) data packet.

13. The device according to claim 12, wherein the first transmission mode is asynchronous and the second transmission mode is isochronous.

14. The device according to claim 12, wherein at least one global asynchronous stream packet (GASP) data packet is transmitted isochronously.

15. The device according to claim 12, wherein the second data packet contains at least one of (a) data for at least two receivers and (b) data from at least two transmitters.

16. The device according to claim 12, wherein the method is carried out on a data bus according to the IEEE 1394 standard.

17. The device according to claim 12, wherein at least one global asynchronous stream packet (GASP) data packet is transmitted isochronously, wherein the second data packet contains at least one of (a) data for at least two receivers and (b) data from at least two transmitters, and wherein the method is carried out on a data bus according to the IEEE 1394 standard.

18. The device according to claim 12, wherein the first transmission mode is asynchronous and the second transmission mode is isochronous.

19. The device according to claim 18, wherein at least one global asynchronous stream packet (GASP) data packet is transmitted isochronously, wherein the second data packet contains at least one of (a) data for at least two receivers and (b) data from at least two transmitters, and wherein the method is carried out on a data bus according to the IEEE 1394 standard.

20. A non-transitory computer-readable medium storing a computer program, which is executable by a processor, comprising a program code arrangement having program code for performing the following:

transmitting a first data packet using a first transmission mode to which the first data packet has been assigned; and transmitting a second data packet using a second transmission mode different from the first transmission mode, wherein the second data packet is initially assigned the first transmission mode, the transmitting of the second data packet using the second transmission mode occurring during a time interval exclusively associated with the second transmission mode, wherein the data packets are transmitted in exactly two transmission modes, wherein one transmission mode is isochronous and a further transmission mode is asynchronous, and transmitting the second data packet together with further data packets as one global asynchronous stream packet (GASP) data packet.

\* \* \* \* \*